(12) United States Patent
Miyakawa

(10) Patent No.: US 7,163,638 B2
(45) Date of Patent: Jan. 16, 2007

(54) METHOD FOR FORMING A TRANSPARENT ELECTRODE FILM

(75) Inventor: Takuya Miyakawa, Okaya (JP)

(73) Assignee: Seiko Epson Corporation (JP)

( * ) Notice: Subject to any disclaimer, the term of this patent is extended or adjusted under 35 U.S.C. 154(b) by 376 days.

(21) Appl. No.: 10/887,221

(22) Filed: Jul. 8, 2004

(65) Prior Publication Data
US 2005/0040135 A1    Feb. 24, 2005

(30) Foreign Application Priority Data
Jul. 23, 2003    (JP)    ............... 2003-200480

(51) Int. Cl.
C30B 33/00    (2006.01)
(52) U.S. Cl. ...................................... 216/23
(58) Field of Classification Search .................. 216/23; 438/30, 149, 151
See application file for complete search history.

(56) References Cited

FOREIGN PATENT DOCUMENTS

JP    09-18601    7/1997

Primary Examiner—Parviz Hassanzadeh
Assistant Examiner—Roberts Culbert
(74) Attorney, Agent, or Firm—Harness, Dickey & Pierce, P.L.C.

(57) ABSTRACT

A method for forming a transparent electrode film is provided. The method includes: forming an insulating film on a substrate material, forming a contact hole in the insulating film, and coating a region where a transparent conductive film is to be formed with a liquid containing a precursor of the transparent conductive film. The liquid coats any unnecessary insulating film formed on the substrate material inside the contact hole when the contact hole is formed. The liquid is a solvent containing fluorine capable of dissolving the unnecessary insulating film. By annealing the liquid to volatilize the components of the unnecessary insulating film dissolved in the precursor substance of the transparent conductive film, the unnecessary insulating film is removed.

8 Claims, 6 Drawing Sheets

FIG. 6

| SAMPLE | SOLVENT | SOLVENT ADDITIVE | IN-SOLUTE | ZN-SOLUTE | SOLUTE ADDITIVE | LIGHT ETCHING | CONTACT RESISTANCE ($\Omega$ cm$^2$) | ANNEALING | RESISTANCY | UV ANNEAL |
|---|---|---|---|---|---|---|---|---|---|---|
| A1 | ACETYL ACETONE | NONE | INDIUM ACETYL ACETONATE | DIBUTYL TIN DIACETATE | NONE | NO | $\infty$ | 400°C | $8 \times 10^{-4}$ | NO |
| B1 | ACETYL ACETONE | NONE | INDIUM ACETYL ACETONATE | DIBUTYL TIN DIACETATE | NONE | YES | 4M | 400°C | $8 \times 10^{-4}$ | NO |
| C1 | ACETYL ACETONE | HF(0.01%) | INDIUM ACETYL ACETONATE | DIBUTYL TIN DIACETATE | NONE | NO | 700K | 400°C | $3 \times 10^{-4}$ | NO |
| D1 | ACETYL ACETONE | NONE | INDIUM ACETYL ACETONATE | DIBUTYL TIN DIACETATE | INF$_3$ | NO | 500K | 400°C | $2 \times 10^{-4}$ | NO |
| E1 | ACETYL ACETONE | NONE | INDIUM ACETYL ACETONATE | DIBUTYL TIN DIACETATE | INF$_3$ | NO | 650K | 200°C | $2.5 \times 10^{-4}$ | YES |
| F1 | ACETYL ACETONE | NONE | INDIUM ACETYL ACETONATE | DIBUTYL TIN DIACETATE | INF$_3$ | NO | ($\infty$)* | 200°C | $\infty$ | NO |
| G1 | ACETYL ACETONE | NONE | INDIUM ACETYL ACETONATE | DIBUTYL TIN DIACETATE | SNF$_4$ | NO | 750K | 400°C | $2 \times 10^{-4}$ | NO |
| H1 | ACETYL ACETONE | NH$_4$F(0.01%) | INDIUM ACETYL ACETONATE | DIBUTYL TIN DIACETATE | NONE | NO | 700K | 400°C | $3 \times 10^{-4}$ | NO |
| A2 | WATER | NONE | INCL$_3$ 4H$_2$O | SNCL$_2$ 2H$_2$O | NONE | NO | $\infty$ | 365°C | $6 \times 10^{-4}$ | NO |
| B2 | WATER | NONE | INCL$_3$ 4H$_2$O | SNCL$_2$ 2H$_2$O | NONE | YES | 4M | 365°C | $6 \times 10^{-4}$ | NO |
| C2 | WATER | HF(0.01%) | INCL$_3$ 4H$_2$O | SNCL$_2$ 2H$_2$O | NONE | NO | 700K | 365°C | $2 \times 10^{-4}$ | NO |
| D2 | WATER | NONE | INCL$_3$ 4H$_2$O | SNCL$_2$ 2H$_2$O | INF$_3$ | NO | 500K | 365°C | $1.5 \times 10^{-4}$ | NO |
| E2 | WATER | NONE | INCL$_3$ 4H$_2$O | SNCL$_2$ 2H$_2$O | INF$_3$ | NO | 650K | 200°C | $2 \times 10^{-4}$ | YES |
| F2 | WATER | NONE | INCL$_3$ 4H$_2$O | SNCL$_2$ 2H$_2$O | INF$_3$ | NO | ($\infty$)* | 200°C | $\infty$ | NO |
| G2 | WATER | NONE | INCL$_3$ 4H$_2$O | SNCL$_2$ 2H$_2$O | SNF$_4$ | NO | 750K | 365°C | $1.5 \times 10^{-4}$ | NO |
| H2 | WATER | NH$_4$F(0.01%) | INCL$_3$ 4H$_2$O | SNCL$_2$ 2H$_2$O | NONE | NO | 700K | 365°C | $2 \times 10^{-4}$ | NO |

* CANNOT BE MEASURED

METHOD FOR FORMING A TRANSPARENT ELECTRODE FILM

RELATED APPLICATIONS

This application claims priority to Japanese Patent Application No. 2003-200480 filed Jul. 23, 2003 which is hereby expressly incorporated by reference herein in its entirety.

BACKGROUND

1. Field of the Invention

The present invention relates to a method for forming a transparent conductive film on an upper layer of a conductive substrate material.

2. Description of the Related Art

Conventionally, when forming a transparent conductive film, a wiring is initially formed on a transparent substrate, and an interlayer film is formed on this wiring. A contact hole is then formed Into this interlayer film using, for example, dry-etching. It is known that on the substrate material inside the contact hole in the interlayer film, an unnecessary insulating film is formed such as a damage layer developing when, for example, dry-etching and/or a natural oxidation film.

If proceeding with the forming of the transparent conductive film while leaving this unnecessary insulating film as it is, the unnecessary insulating film will have an influence on the electrical properties of the transparent conductive film due to its insulating effect. Therefore, conventionally, such an unnecessary insulating film is attempted to be removed (see for example Japanese Patent Application Laid-Open No. 9-186101 (FIG. 2)). In such conventional art, this unnecessary insulating film developing after forming the contact hole into the interlayer film on the surface of a gate electrode composing the substrate material, consisting for example of aluminum, is removed by wet etching.

As it is, in such conventional art, after forming the contact hole to the gate electrode, the exclusive removal of the unnecessary insulating film has to be carried out by wet etching in a separate manufacturing step from forming the transparent conductive film. This extra step is counterproductive to efforts to simplify manufacturing steps.

Accordingly, the present invention is intended to solve the above-mentioned issue by providing a method for forming a transparent electrode film that allows simplifying the manufacturing steps by omitting the step of exclusively removing the unnecessary insulating film that develops after forming the contact hole.

SUMMARY

According to a first aspect of the invention, the above-mentioned is achieved by a method for forming a transparent conductive film on an upper layer of a conductive substrate material. The method includes forming an insulating film on the substrate material and a contact hole in the insulating film, followed by coating the part where the transparent conductive film is to be formed with a liquid so as to cover an unnecessary insulating film developing on the substrate material inside the contact hole after the contact hole is formed. This liquid contains a precursor substance of the transparent conductive film, and is also a solvent containing fluorine capable of dissolving the unnecessary insulating film. The method also includes annealing to volatilize the components of the unnecessary insulating film dissolved in the precursor substance of the transparent conductive film.

According to the above-mentioned construction, the liquid containing the precursor substance of the transparent conductive film is coated against the unnecessary insulating film that develops after the contact hole is formed into the insulating film on the substrate material. Consequently, the precursor substance of the transparent conductive film will dissolve the unnecessary insulating film and absorb it in the liquid that contains the precursor substance of the transparent conductive film. Under these conditions, when the liquid containing the precursor substance of the transparent conductive film is subjected to volatilization, the components of the unnecessary insulating film solved in the precursor substance of the transparent conductive film will volatilize. Therefore, according to this method for forming a transparent conductive film, the step of exclusively removing the unnecessary insulating film can be omitted, and thus, the manufacturing steps can be simplified.

Further, as a secondary effect, according to an aspect of the present invention, the contact resistance between the substrate material and the transparent conductive film can be reduced.

A second aspect of the invention is that the solvent in the construction according to the first aspect of the invention is an organic solvent.

A third aspect of the invention is that the solvent in the construction according to the second aspect of the invention is acetyl acetone, and the solute in the solvent contains indium acetyl acetonate, dibutyltin diacetate and fluorine.

A fourth aspect of the invention is that the solvent in the construction according to the first aspect of the invention is an inorganic solvent.

A fifth aspect of the invention is that the solvent in the construction according to the fourth aspect of the invention is water, and the solute in the solvent contains indium chloride, tin chloride and fluorine.

A sixth aspect of the invention is that the solute in the solvent according to either one of the third and the fifth aspects of the invention contains indium fluoride.

A seventh aspect of the invention is that the annealing in the construction according to any one of the first to sixth aspects of the invention is carried out using a heavy mercury lamp.

According to the construction as mentioned above, the contact resistance between the substrate material and the transparent conductive film can be reduced.

BRIEF DESCRIPTION OF THE DRAWINGS

FIG. 6 is a chart showing examples of the electrical properties and the like in various cases of forming the transparent conductive film.

DETAILED DESCRIPTION

The following is an explanation of the preferred embodiments of the present invention with reference to the drawings.

Figure 1:
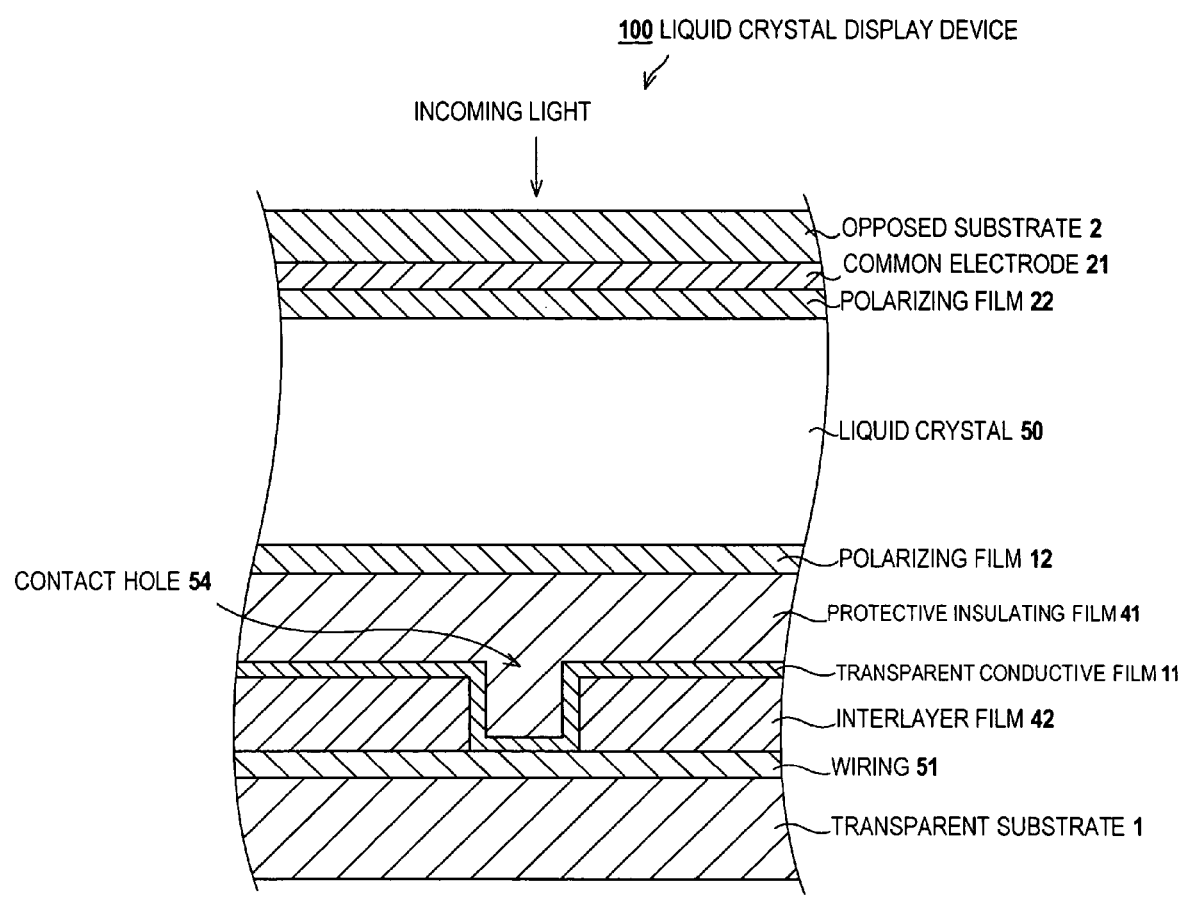
FIG. 1 is a sectional view showing an example of the construction of a liquid crystal display device containing a transparent conductive film.

FIG. 1 is a sectional view showing an example of a construction of a liquid crystal display device 100 containing a transparent conductive film 11. In FIG. 1, the part where the transparent conductive film 11 is formed in a contact hole 54 is shown in magnification, whereas the other parts have been omitted. Further, in this liquid crystal display device 100, the backlight is not shown.

The liquid crystal display device 100 includes the transparent conductive film 11 formed according to a method for forming a transparent conductive film that is a preferred embodiment of the present invention. This liquid crystal display device 100 has, starting from the display side that is on the opposite side of the side of the incoming light, a transparent substrate 1, a wiring 51 (gate electrode), an interlayer film 51 (gate insulator), the transparent conductive film 11, the contact hole 54, a protective insulating film 41, an orientation film 12, a liquid crystal 50, an orientation film 22, a common electrode 21 and an opposing substrate 2.

The liquid crystal display device 100 in FIG. 1 has the transparent substrate 1 and the opposing substrate 2 that is transparent and provided so as to oppose the transparent substrate 1. The transparent substrate 1 is for example a quartz substrate or of a non-alkali glass material, and the opposing substrate 2 is for example a glass substrate.

In this liquid crystal display device 100, the transparent conductive film 11 includes a plurality of films (pixel electrodes) arranged in matrix form, and in the upper side of the view the orientation film 22, on which a defined orientating treatment such as rubbing is performed, is provided covering the entire surface. This transparent conductive film 11 is for example a transparent conductive thin film such as an ITO (Indium Tin Oxide) film and the like. Further, the orientation film 12 is for example an organic thin film such as a polyimide thin film.

On the other side, on the opposing substrate 2, the common electrode 21 is provided that covers the entire surface, and on its lower side the orientation film 22 is provided on which a defined orientating treatment such as rubbing has been performed. The common electrode 21 is for example a transparent conductive thin film such as an ITO (Indium Tin Oxide) film. Further, the orientation film 22 is for example an organic thin film such as a polyimide thin film.

With the transparent substrate 1, in the proximity of each of the plurality of films of the transparent conductive film 11, a Thin Film Transistor or TFT (not shown) is provided for the switching control of each of the plurality of films of the transparent conductive film 11. This TFT functions as a switching element. Further, a black matrix is provided on the opposing substrate 2, for example, in a defined region opposed to the TFT here not shown.

Between the orientation film 12 and the transparent conductive film 11, the protective insulating film 41 is provided. The protective insulating film 41 is provided in order to insulate a p-Si layer that forms the TFT from a light shield layer (not shown). Furthermore, the protective insulating film 41, being formed on the entire surface of the transparent substrate 1, functions as a substrate film for the TFT. That is to say, the protective insulating film 41 helps to prevent the deterioration of the properties of the TFT due to roughness caused when grinding the surface of the transparent substrate 1, or due to contaminants left after cleaning and the like.

On the lower side of the protective insulating film 41, the transparent conductive film 11 is formed alongside the interlayer film 42 (gate insulator) having insulating properties. The interlayer film 42 contains for example $SiO_2$ as a material. This transparent conductive film 11 is electrically connected to the wiring 51 (gate electrode) through the contact hole 54. That is to say, this contact hole 54 connects the transparent conductive film 11 and the wiring 51 that are provided in different layers. This wiring 51 is for example of a polysilicon material.

The contact hole 54, as shown, is a hole formed into the interlayer film 42, and when it is formed by etching and the like, due to the etching and the like an unnecessary insulating film such as a damage layer or a natural oxidation film happens to be formed on the transparent substrate 1, as is generally known. In the present embodiment, as will be explained in the following, the unnecessary insulating film is removed at the same time as forming the transparent conductive film 11. Here, on the lower side of the wiring 51, the transparent substrate 1 is provided.

An explanation follows now of an example of the process steps pertaining to the method for forming the transparent conductive film 11, with further reference to FIG. 1.

Figure 2:
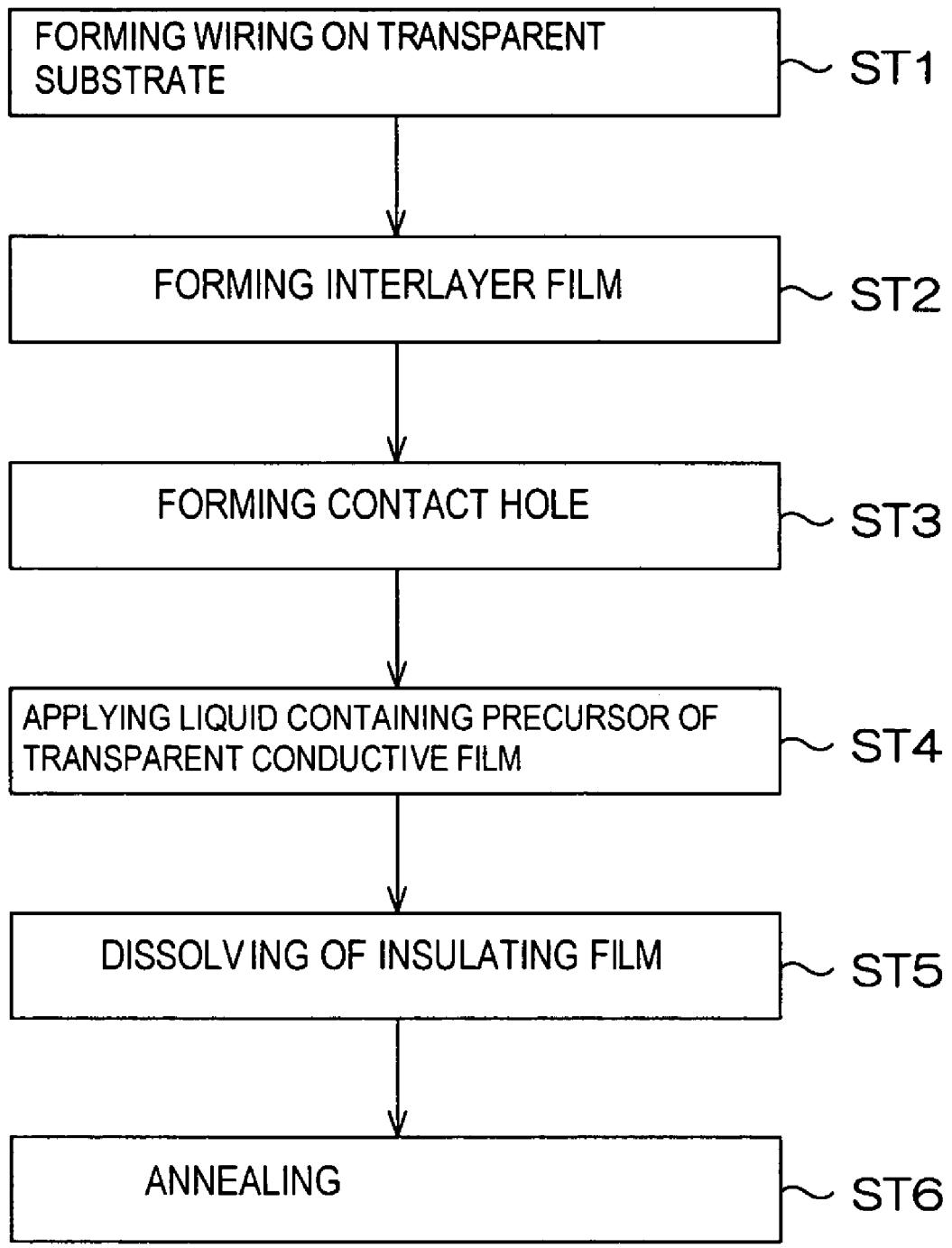
FIG. 2 is a flowchart showing an example of the manufacturing steps of a liquid crystal display device that includes forming a transparent conductive film.
Figure 3:
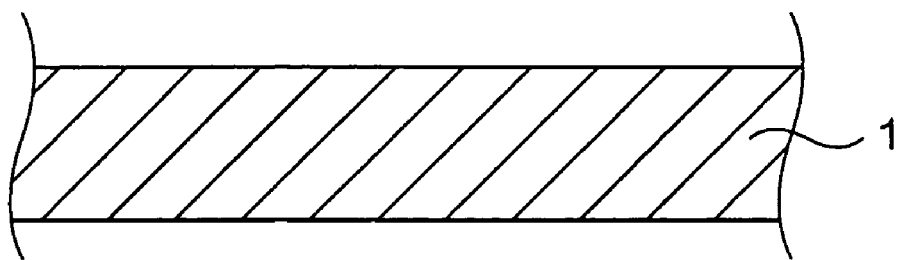
FIGS. 3(A)–(C) are sectional views showing an example of states in manufacturing the liquid crystal display device.
Figure 3:
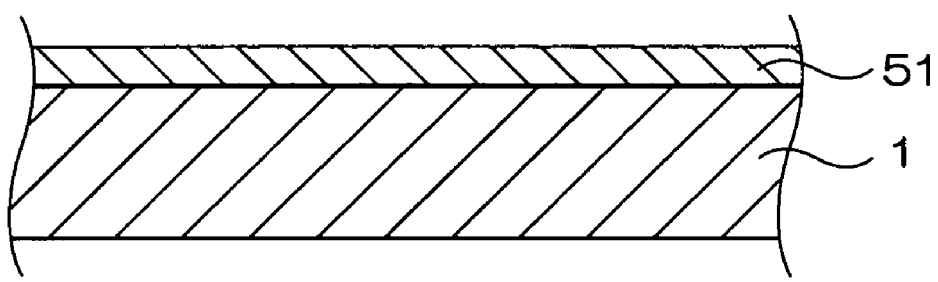
Figure 3:
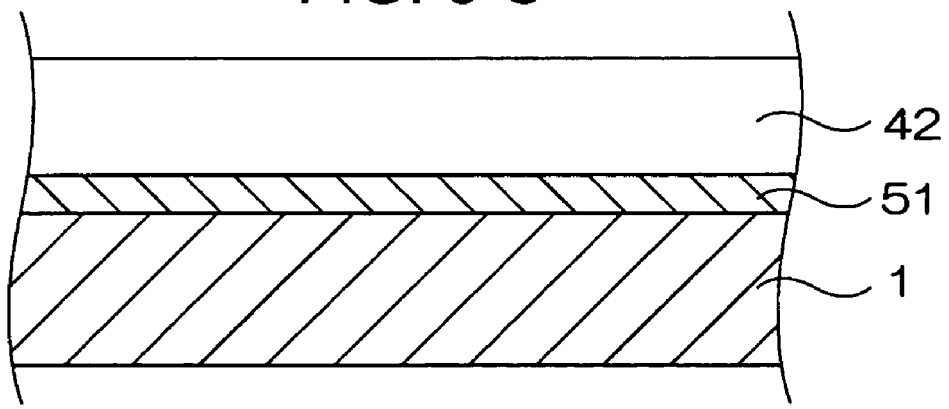
Figure 4:
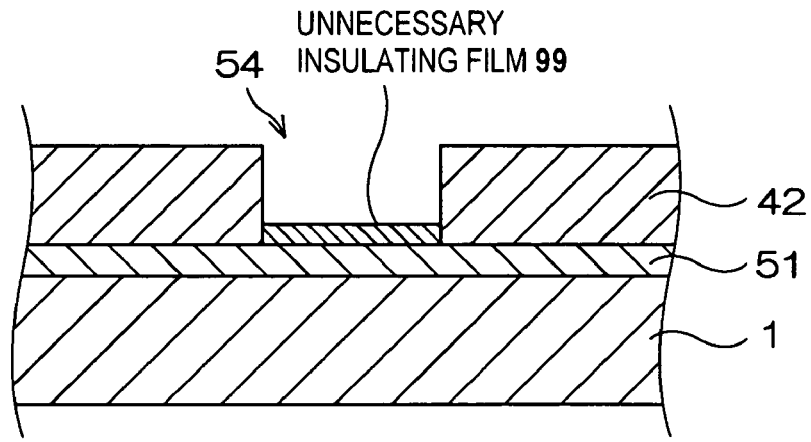
FIGS. 4(A)–(C) are sectional views showing an example of states in manufacturing the liquid crystal display device.
Figure 4:
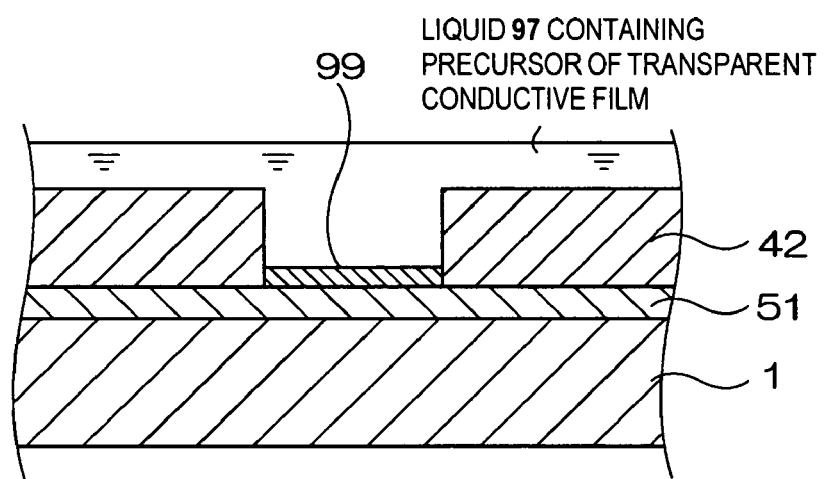
Figure 4:
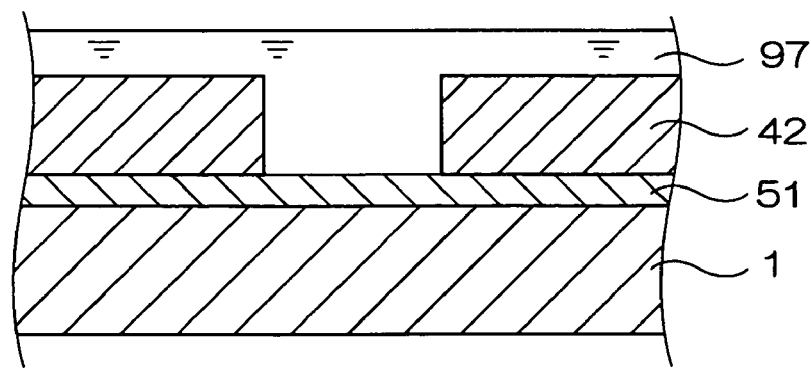
Figure 5:
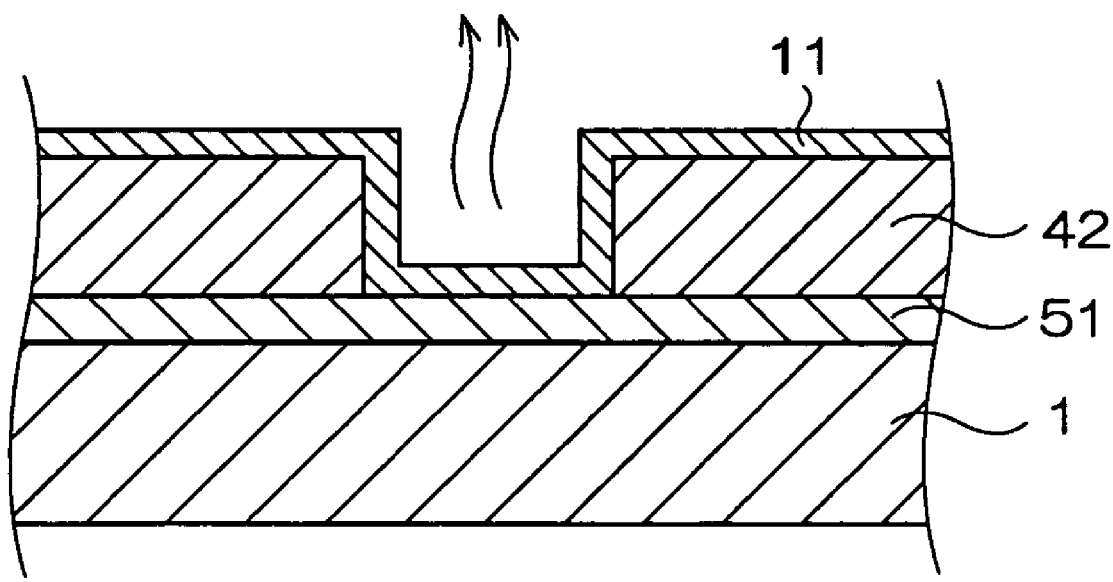
FIG. 5 is a sectional view showing an example of a state in manufacturing the liquid crystal display device.

FIG. 2 is a flow chart showing an example of the process steps pertaining to the method for manufacturing the liquid crystal display device 100 including the formation of the transparent conductive film 11. FIGS. 3 through 5 are sectional views showing examples of states, each shown in FIG. 2, in the manufacturing of the liquid crystal display device 100 including the transparent conductive film 11. FIGS. 3 through 5 show a simplified sectional structure, and together with FIG. 2, the explanations will mainly center around the part relating to the forming of the transparent conductive film 11.

First, as shown in FIG. 3 (A), the transparent substrate 1 (TFT array substrate) consisting of a quartz substrate, hard glass or the like is provided. Next, a light shield layer formed out of a metal silicide of a metal with a high melting point such as W (tungsten) is formed on the entire surface of the transparent substrate 1 for example by sputtering, CVD (Chemical Vapor Deposition) and the like. After that, by photolithography, etching and the like, the light shield layer, here not shown, is completed by leaving the light shield layer initially formed on the entire substrate surface only on the regions where the TFT is to be formed at a later stage.

Next, in step ST1 of FIG. 2, the wiring 51 (gate electrode) is formed on the transparent substrate 1, as shown in FIG. 3 (B). Next, in step ST2 of FIG. 2, the interlayer film 42 having insulating properties is formed on the wiring 51, as shown in FIG. 3 (C). Next, in step ST3, the contact hole 54 is formed into the interlayer film 42, as shown in FIG. 4 (A).

More specifically, this contact hole 54 is formed for example by dry etching such as reactive etching or reactive ion beam etching. It is generally known that after the contact hole 54 is formed so as to expose the wiring 51 by perforating the interlayer film 42, inside this contact hole 54, an unnecessary insulating film 99 happens to be formed on the wiring 51 such as a damage layer due to damage occurring on the wiring 51 while etching and/or a natural oxidation film due to natural oxidation.

Next, in step ST4 of FIG. 2, a liquid 97 containing the precursor of the transparent conductive film 11 is applied onto the interlayer film 42 containing the contact hole 54, as shown in FIG. 4 (B). This liquid 97 containing a precursor of the transparent conductive film 11 is a solvent containing fluorine that is capable of dissolving the unnecessary insulating film 99 formed on the wiring 51 inside the contact hole 54 after forming the contact hole 54 into the interlayer film 42.

In this context, the precursor of the transparent conductive film 11 means a precursor substance to become the transparent conductive film 11. In this liquid 97 containing the precursor of the transparent conductive film 11, an organic solvent or an inorganic solvent can be used for example.

When using an organic solvent as this liquid 97 containing the precursor of the transparent conductive film 11, acetyl acetone can be used for example. Further, as a solute in the solvent, an organometallic compound can be used such as indium acetyl acetonate, dibutyltin diacetate and/or alkoxides.

Further, when using an inorganic solvent as this liquid 97 containing a precursor of the transparent conductive film 11, water can be used for example. Further, examples of a solute added to the inorganic solvent include a chloride, an inorganic salt such as a nitrate, $InCl_3.4H_2O$ and/or $SnCl_2.2H_2O$.

As a solute additive to the solute of this organic or inorganic solvent, $InF_3$ can be given as an example. Further, as a solvent to be added to this organic or inorganic solvent, HF or $NH_4F$ can be given as an example.

Next, in step ST5 of FIG. 2, this liquid 97 containing the precursor of the transparent conductive film 11 dissolves the unnecessary insulating film 99, as shown in FIG. 4 (C). This unnecessary insulating film 99 dissolves, as the liquid 97 containing the precursor of the transparent conductive film 11 contains fluorine, and this fluorine chemically reacts with the unnecessary insulating film 99, consequently going into a solution in the liquid 97 containing the precursor of the transparent conductive film 11.

When using the liquid 97 containing the precursor of the transparent conductive film 11 to dissolve the unnecessary insulating film 99 in this way, as opposed to conventional ways, it is possible to omit the step of expressly light etching the unnecessary insulating film 99 in order to remove the unnecessary insulating film 99.

Next, in step ST6 of FIG. 2, annealing, using for example a heavy mercury lamp, is carried out on the liquid 97 containing the precursor of the transparent conductive film 11, and, as shown in FIG. 5, the transparent conductive film 11 is formed on the wiring 51 and the contact holes 54. The light etching step of conventional forming methods is unnecessary here because the components of the unnecessary insulating film 99 evaporate when the annealing is carried out.

It is understood that, as an alternative to carrying-out annealing on the liquid 97 containing the precursor of the transparent conductive film 11, for example UV rays (ultraviolet rays) can be applied instead.

Next, as shown in FIG. 1, the protective insulating film 41 is formed on the transparent conductive film 11. On the protective insulating film 41, the orientation film 12, the liquid crystal 50, the orientation film 22, the common electrode 21 and the opposing substrate 2 are formed, and the liquid crystal display device 100 is completed.

FIG. 6 is a chart showing examples of the electrical properties and the like in forming the transparent conductive film 11 under various conditions.

In this FIG. 6, solvents, solvent additives added to the solvents, solutes, and solute additives added to the solutes, of the liquid 97 containing the precursor of the transparent conductive film 11, are exemplified, followed by whether light etching was carried out or not, anneal temperatures, whether anneal treatment was carried out by UV or not. The chart shows examples of electrical properties such as contact resistance and resistivity under these conditions.

First, as a solvent, acetyl acetone as an example for an organic type, and water as an example for an inorganic type are exemplified.

For the organic solvents in the upper rows, for example, with acetyl acetone as a solvent, the cases of 0.01% of HF added as a solvent additive, of 0.01% of $NH_4F$ added as a solvent additive, and of no additive at all, are exemplified. Further, the case of indium acetyl acetonate as an In-solute and the case of 7.5 mol % dibutyltin diacetate as an Sn-solute are exemplified. Further, the cases of adding 1% of $InF_3$, or $SnF_4$ as a solute additive, or of adding no solute additive are exemplified.

In the upper rows of FIG. 6, the cases of carrying out light etching and of not carrying out light etching are exemplified. Further, in the upper rows of FIG. 6, the cases of carrying out anneal treatment at 200 degrees centigrade and of carrying out anneal treatment at 400 degrees centigrade are exemplified. Further, in FIG. 6, the cases of using UV rays for (ultraviolet rays) for the anneal treatment or not are exemplified. Here, the resistivity shows the resistance value of the transparent conductive film 11 as a film formed by a liquid.

On the other side, for the inorganic solvent in the lower rows, for example, with water as a solvent, the cases of 0.01% of HF added as a solvent additive, of 0.01% of $NH_4F$ added as a solvent additive, and of no additive at all, are exemplified. Further, the cases of adding 7.5 mol % of $InCl_3.4H_2O$ as an In-solute, and of dibutyltin diacetate as an Sn-solute are exemplified. Further, the cases of adding 1% of $InF_3$, or $SnF_4$ as a solute additive, or of adding no solute additive are exemplified.

Sample A1 and sample A2 are each comparative examples, while sample B1 and sample B2 are each conventional examples.

First, the samples A1 through H1 with the solvent being an organic solvent will be investigated.

In sample B1, when forming the transparent conductive film 11 after carrying out light etching at an anneal temperature of 400 degrees centigrade, the resistivity is $8\times10^{-4}$ and the contact resistance is 4 M$\Omega$-cm$^2$. In contrast thereto, in sample A1 with light etching not being carried out, though the resistivity is the same as in the conventional case, the contact resistance reaches a larger value than the comparison sample B1 because the value of sample A1 is infinite, as was to be expected with the unnecessary insulating film 99 remaining.

In sample C1 with for example 0.01% of HF added as a solvent additive to the solvent, with no solute additive and when neither light etching nor UV annealing is carried out, the resistivity becomes $3\times10^{-4}$, and thus can be brought down below the comparison sample A1. In this case, the contact resistance is 700 k$\Omega$-cm$^2$ for example.

Next, in sample D1, with no solvent additive and solute additive $InF_3$, the resistivity can be further brought down to $3\times10^{-4}$ for example. In this case, the contact resistance can be further decreased to 500 k$\Omega$-cm$^2$. Next, in sample E1, when for example annealing is carried out at a low temperature of 200 degrees centigrade and with UV annealing, the resistivity becomes $2.5\times10^{-4}$, and with the contact resistance at 650 k$\Omega$-cm$^2$, it follows that the contact resistance can be decreased even when reducing the anneal treatment temperature. For this UV annealing, for example a deuterium lamp is used, and an irradiation is carried out with light from a deuterium lamp of a wavelength of 110 nm to 160 nm for example.

Next, in sample F1 with no UV annealing, the resistivity becomes infinite, and it thus becomes impossible to measure the contact resistance. Next, in sample G1, when choosing $SnF_4$ as a solute additive, and 400 degrees centigrade as the anneal treatment temperature, the resistivity becomes for example $2 \times 10^{-4}$, and the contact resistance becomes 750 k$\Omega$-cm$^2$. Next, in sample H1, when for example choosing 0.01% of $NH_4F$ as a solvent additive, and no solute additive, the resistivity becomes for example $3 \times 10^{-4}$, and the contact resistance becomes 700 k$\Omega$-cm$^2$.

According to these validation results, the most favorable result is that of sample E1, as the contact resistance can be reduced, while UV annealing is carried out and with annealing at a low temperature of for example 200 degrees centigrade.

Next, the samples A2 through H2 with the solvent being an organic solvent will be investigated.

In sample B2, when choosing to form the transparent conductive film 11 after carrying out light etching at an anneal temperature of 365 degrees centigrade, the resistivity is for example $6 \times 10^{-4}$, and the contact resistance is 4 M$\Omega$-cm$^2$. In contrast thereto, in sample A2 with light etching not being carried out, though the resistivity is the same as in the conventional case, the contact resistance reaches a larger value than the comparison sample B2 because the value of sample A2 is infinite, as was to be expected with the unnecessary insulating film 99 remaining.

In sample C2 with for example 0.01% of HF added as a solvent additive to the solvent and no solute additive, and when neither light etching nor UV annealing is carried out, the resistivity becomes $2 \times 10^{-4}$, and thus can be brought down below the comparison sample A1. In this case, the contact resistance is 700 k$\Omega$-cm$^2$ for example.

Next, in sample D2, with no solvent additive and solute additive $InF_3$, the resistivity can be further brought down to $1.5 \times 10^{-4}$ for example. In this case, the contact resistance can be further decreased to 500 k$\Omega$-cm$^2$. Next, in sample E2, when annealing is carried out at a low temperature of for example 200 degrees centigrade and with UV annealing, the resistivity becomes $2 \times 10^{-4}$, and with the contact resistance at 650 k$\Omega$-cm$^2$, it follows that the contact resistance can be decreased even when reducing the anneal treatment temperature. For this UV annealing, for example a deuterium lamp is used, and an irradiation is carried out with light from a deuterium lamp of a wavelength of 110 nm to 160 nm for example.

Next, in sample F2 with no UV annealing, the resistivity becomes infinite, and it thus becomes impossible to measure the contact resistance. Next, in sample G2, when choosing $SnF_4$ as a solute additive, and 365 degrees centigrade as the anneal treatment temperature, the resistivity becomes for example $1.5 \times 10^{-4}$, and the contact resistance becomes 750 k$\Omega$-cm$^2$. Next, in sample H2, when for example choosing 0.01% of $NH_4F$ as a solvent additive, and with no solute additive, the resistivity becomes for example $2 \times 10^{-4}$, and the contact resistance becomes 700 k$\Omega$-cm$^2$.

According to these validation results, the most favorable result is that of sample E2, as the contact resistance can be reduced, while UV annealing is carried out and with annealing at a low temperature of for example 200 degrees centigrade.

According to the preferred embodiment of the present invention, as the liquid 97 is coated on the unnecessary insulating film 99 developing after forming the contact hole 54 into the interlayer film 42 on the wiring 51, and this liquid 97 contains the precursor of the transparent conductive film 11, this precursor of the transparent conductive film 11 dissolves the unnecessary insulating film 99, and solves it in the liquid 97 containing the precursor of the transparent conductive film 11.

In this state, when the liquid 97 containing the precursor of the transparent conductive film 11 undergoes volatilizing treatment, the components of the unnecessary insulating film 99 solved in the precursor of the transparent conductive film 11 are volatilized. Therefore, according to this method for forming the transparent conductive film 11, the manufacturing steps can be simplified by combining the step of annealing with the step of light etching, and thus omitting the step of exclusively removing the unnecessary insulating film 99.

Further, according to another embodiment of the present invention, by adding for example 3% of indium fluoride as a solute additive to the liquid 97 containing the precursor of the transparent conductive film 11, the contact resistance can be brought down from 2 M$\Omega$ to 100 k$\Omega$. That is to say, as a secondary effect, according to the embodiments of the present invention, the contact resistance between the wiring 51 as the substrate material and the transparent conductive film 11 can be reduced.

The present invention is not limited to the above-mentioned embodiments, but rather allows for various variations within the scope of the Claims. For example, part of each construction of the above-mentioned embodiments can be omitted or arbitrarily combined so as to differ from the above-mentioned.

In the above-mentioned embodiments, a method for forming a transparent conductive film of for example a liquid crystal display device is shown, but not limited to this, they can also be applied to the removal of an unnecessary insulating film while forming a conductive film in general.

What is claimed is:

1. A method for forming a transparent conductive film on an upper layer of a conductive substrate material, comprising:

forming an insulating film on the substrate material;

forming a contact hole in the insulating film;

coating a region where the transparent conductive film is to be formed with a liquid containing a precursor substance of the transparent conductive film, the liquid coating any unnecessary insulating film that may have formed on the substrate material inside the contact hole after the contact hole is formed, the liquid being a solvent containing fluorine capable of dissolving the unnecessary insulating film; and annealing the liquid to volatilize components of the unnecessary insulating film dissolved in the precursor substance of the transparent conductive film.

2. The method for forming a transparent conductive film according to claim 1, wherein the solvent further comprises an organic solvent.

3. The method for forming a transparent electrode film according to claim 2, wherein the solvent further comprises acetyl acetone, and a solute added to the solvent includes indium acetyl acetonate, dibutyltin diacetate and fluorine.

4. The method for forming a transparent conductive film according to claim 3, wherein the solute added to the solvent includes indium fluoride.

5. The method for forming a transparent conductive film according to claim 1, wherein the solvent further comprises an inorganic solvent.

6. The method for forming a transparent, electrode film according to claim 5, wherein the solvent further comprises water, and a solute added to the solvent includes one of indium chloride, tin chloride and water.

7. The method for forming a transparent conductive film according to claim 6, wherein the solute added to the solvent includes indium fluoride.

8. The method for forming a transparent conductive film according to claim 1, wherein the annealing is carried out using a mercury lamp.

* * * * *